May 2, 1967 R. W. TABBERT 3,316,605

NUT LOCKING CONSTRUCTION

Filed Sept. 14, 1964

INVENTOR.
RICHARD W. TABBERT
BY
Harry O. Ernsberger
ATTORNEY 3,316,605
NUT LOCKING CONSTRUCTION
Richard W. Tabbert, Toledo, Ohio, assignor, by mesne assignments, to Oldberg Manufacturing Company, Toledo, Ohio, a corporation of Michigan
Filed Sept. 14, 1964, Ser. No. 396,171
3 Claims. (Cl. 24—277)

This invention relates to a nut locking construction and more especially to a locking configuration embodied in a clamp or clamping component for cooperation with a securing nut and bolt.

It has been conventional practice in securing clamps or clamp components in clamping position, associated with a threaded bolt or member, to employ a conventional split type of lock washer between the clamp component and the securing nut to provide a locking arrangement resisting dislodgment of the securing nut. Other locking devices that have been used include various means embodied in or associated with the locking nut per se to resist dislodgment of the nut.

The present invention relates to a method of fashioning a clamp or clamp component with a serrated configuration adapted, when a nut, threaded on a bolt, is drawn into engagement therewith, to resist dislodgment or loosening of the nut from the bolt.

An object of the invention resides in providing a clamp or clamp component with an opening defined by a raised annular portion forming a nut engaging region formed with serrations of a character providing a plurality of teeth or projections integral with the clamp adapted to be engaged by a conventional threaded nut when the latter is threaded upon a bolt or threaded component of a clamping structure to effectively lock or secure the nut in drawn up or tightened position.

Another object of the invention is the provision of a clamp or clamp component integrally fashioned with an annular portion configurated to provide a plurality of sharp edged teeth arranged to be engaged by a nut when threaded upon a bolt associated with the clamping component to securely establish locking engagement of the teeth with the nut.

Another object of the invention resides in the provision of a nut locking configuration formed of the metal of a clamp or clamp component to secure effective locking engagement with a conventional threaded nut and eliminating the use of lock washers or other extraneous nut locking means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
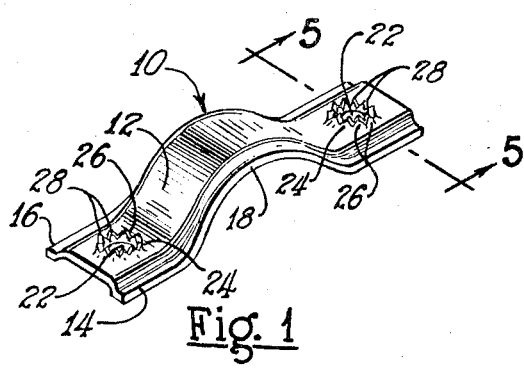
FIGURE 1 is an isometric view of a clamp component or saddle clamp embodying an integral nut locking configuration of the invention.
Figure 5:
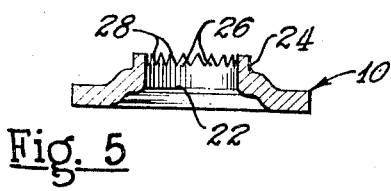
FIGURE 5 is an enlarged transverse sectional view taken substantially on the line 5—5 of FIGURE 1 illustrating one form of integral locking configuration of the invention.
Figure 7:
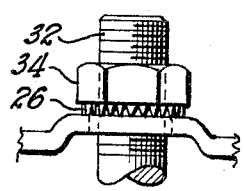
Figure 8:
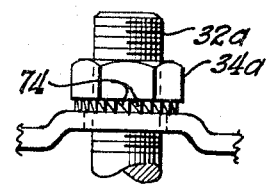
Figure 6:
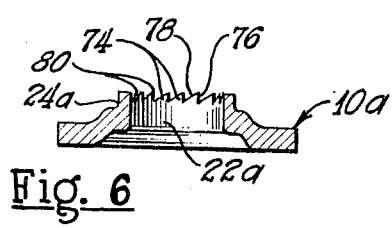
FIGURE 6 is a sectional view similar to FIGURE 5 illustrating a modified form of integral locking configuration.

FIGURE 7 illustrates the clamp component or saddle of FIGURE 1 with the locking configuration of FIGURE 5 in association with a threaded bolt and securing nut in engagement with the locking configuration, and FIGURE 8 illustrates the clamp component or saddle clamp of FIGURE 1 with the locking configuration of FIGURE 6 in association with a bolt and securing nut in engagement with the locking configuration.

While the nut locking configuration of the invention is illustrated as integrally formed on several types of clamps or clamp components, it is to be understood that the nut locking configuration may be embodied in other types or shapes of clamps or clamping components wherever the same may be found to have utility.

Figure 3:
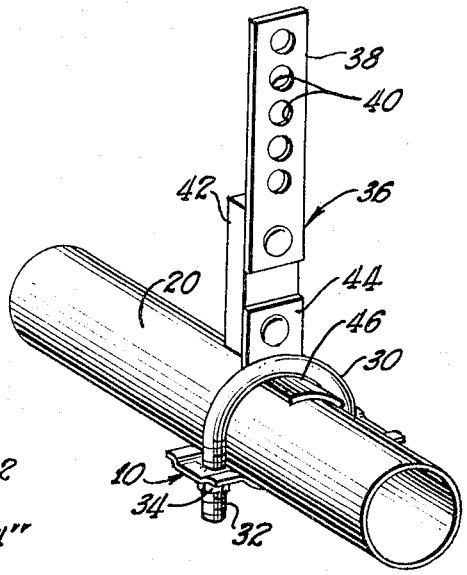
FIGURE 3 is an isometric view illustrating the clamp component or saddle clamp of FIGURE 1 employed with a U-shaped clamping bolt or component for supporting a tubular member.

Referring to the drawings in detail and initially to FIGURE 1, there is illustrated a clamp component such as a saddle clamp embodying the invention utilized in the manner illustrated in FIGURE 3 in association with a U-shaped bolt or clamp member having threaded leg portions receiving threaded nuts of conventional construction, FIGURE 5 illustrating a form of nut locking configuration embodied in the saddle clamp shown in FIGURE 1. The clamp or saddle 10 is formed with a central longitudinal panel portion or web 12 having integral lengthwise arranged flanges 14 and 16 offset from the panel or web portion 12 to impart strength and rigidity to the clamp member. The clamp 10 is provided at its central or mid region with a curved or arcuate configuration 18 of a dimension to fit the exterior cylindrical surface of a tube or tubular member 20 shown in FIGURE 3.

The cross sectional configuration of the panel portion 12 and flanges 14 and 16 is substantially the same throughout the length of the clamp 10. The clamp of this configuration is usually referred to as a saddle clamp by reason of the curved configuration 18 adapted to engage or straddle a tubular member to which it may be clamped.

The panel portion 12 of the saddle clamp 10 at each side of the curved region 18 is blanked or punched to form a circular opening 22, and the material of the clamp adjacent the opening being drawn or shaped to provide an annular boss portion 24 defining each of the openings 22. The boss portion 24 is coined or otherwise processed to provide a serrated configuration comprising a series of circumferentially arranged teeth 26, each tooth having a sharp apex 28. It has been found that serrations of a depth of about $\frac{1}{32}$ of an inch provide teeth 26 effective for nut locking purposes.

FIGURE 3 illustrates one method of use of the clamp or saddle component 10 shown in FIGURE 1. In this form a U-shaped bolt or element 30 straddles the upper portion of the tube 20, the leg portions 32 of the U-shaped bolt 30 being threaded to accommodate securing nuts 34 of conventional construction. In the arrangement shown in FIGURE 3, the tube 20 may be the exhaust pipe forming a component of an exhaust gas conveying system for an internal combustion engine in an automotive vehicle. FIGURE 3 illustrates a support means 36 comprising a metal plate or strap 38 having openings 40 for securing the strap to the chassis or frame of an automotive vehicle.

The plate 38 is secured to a nonmetallic member 42 fashioned of fabric-reinforced rubber or the like to reduce the transmission of vibrations or sound waves of the exhaust gas stream moving through the tube 20 to the vehicle body.

Secured to the nonmetallic member 42 is an L-shaped bracket 44, the projecting leg 46 thereof extending between the bight portion of U-shaped bolt 30 and the outer surface of the tube 20 in the manner shown in FIGURE 3.

In assembling the components in the relation illustrated in FIGURE 3, the U-shaped bolt 30 is placed astraddle the bracket portion 46 and the tube 20, and the saddle clamp 10 fitted into the position shown with the threaded leg portions 32 of U-shaped bolt 30 extending through the openings 22 in the saddle clamp 10. The threaded nuts 34 are applied to the threaded legs 32 and drawn up into snug engagement with the apices 28 of the teeth 26 to provide a locking engagement between the teeth and the nut.

During the nut tightening or drawing operation, the apices 28 of the teeth engage the nut providing substantial frictional resistance to dislodgment or loosening of the nuts under the influence of vibrations to which the construction may be subjected. This arrangement of locking device integral with a clamp or clamp component provides an effective nut locking construction without the use of extraneous devices such as lock washers or the like. In the form shown in FIGURES 1, 5 and 7, the teeth 26 are of V-shape, and each of the nuts 34 threaded on a leg portion 32 of the U-bolt 30 engages the apices of the teeth 26 in the manner illustrated in FIGURE 7.

Figure 2:
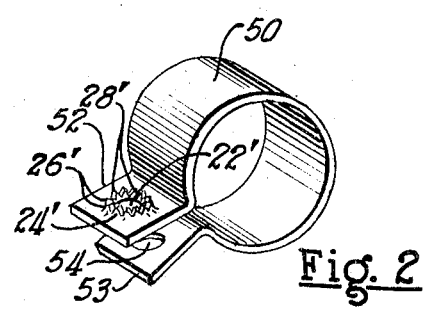
FIGURE 2 is an isometric view showing an annularly-shaped clamp construction embodying an integral nut locking configuration of the invention.

FIGURE 2 illustrates a clamp or clamp construction in the form of a circular metal band 50 having its end regions shaped to provide radial or transversely extending planar projections or portions 52 and 53. The portion 53 is provided with an opening 54 to receive a conventional threaded clamping bolt (not shown). The projection 52 is formed with a boss portion 24′ defining an opening 22′, the boss being serrated or configured to provide teeth 26′ of V-shaped configuration presenting sharp apices 28′, the construction being the same as that shown in FIGURES 1 and 5.

When the clamp 50 surrounds an element (not shown) to which it is to be secured, and a nut, threaded on a bolt extending through the openings 54 and 22′, drawn into engagement with the apices 28′ of the teeth 26′ in the manner shown in FIGURE 7, the teeth resist dislodgment or loosening of the nut, providing an effective nut-locking arrangement.

Figure 4:
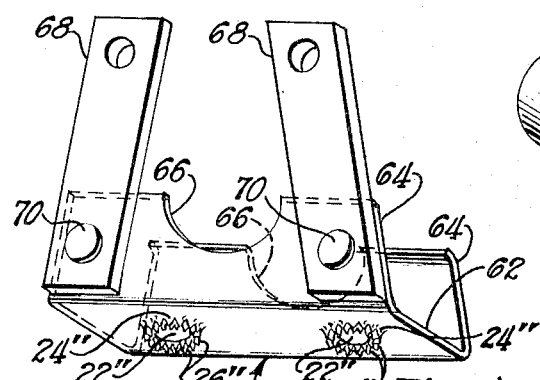
FIGURE 4 is an isometric view illustrating another form of clamp component or saddle clamp embodying an integral nut locking configuration of the invention.

FIGURE 4 illustrates a modified form of saddle clamp or clamp member 60 having a panel or web portion 62 and substantially parallel wall portions 64 integrally formed with the panel or web portion 62. Each of the wall portions 64 is fashioned with a curved or semicircular recess 66 to accommodate a tube such as tube 20 shown in FIGURE 3. The saddle clamp 60 may be suspended from a frame portion (not shown) of a vehicle by straps or members 68 fashioned of fabric reinforced rubber or other nonmetallic material, the straps being secured to a wall 64 of the clamp by rivets 70.

The planar panel or web 62 of the saddle clamp 60 is fashioned with openings 22″, each defined by a raised boss 24″ serrated or fashioned with teeth 26″ of the character shown in FIGURE 5.

In assembling the saddle clamp 60 with a tube, such as tube 20 shown in FIGURE 3, the tube is nested in the semicircular recesses 66 of the walls 64 and a U-bolt, of the character shown at 30 in FIGURE 3, placed astraddle the tube with the threaded legs of the U-bolt inserted in the openings 22″ and standard nuts, of the character shown at 34 in FIGURE 7, threaded onto the legs of the U-bolt and drawn into engagement with the apices of the teeth 26″ to provide a locking arrangement preventing dislodgment or loosening of the nuts.

FIGURES 6 and 8 illustrate a modified form of locking configuration formed on a clamp or clamp member. The clamp member 10a is shaped to provide openings 22a, one of which is shown in FIGURE 6, defined by an integral raised boss portion 24a. The upper surface region of the boss 24a is shaped or coined with serrations of a configuration providing ratchet-shaped teeth 74, each tooth being defined by a leading face or edge 76 substantially parallel with the axis of the opening 22a and by an angularly arranged rake or ramp surface 78, the juncture of each surface 76 and 78 forming a sharp apex 80 of the tooth.

FIGURE 8 illustrates the arrangement of FIGURE 6 in assembly with a threaded bolt 32a and a nut 34a drawn up into tight engagement with the apices 80 of the teeth 74 to establish a locking configuration for the nut 34a. Where the teeth 74 are employed with a nut having a righthand thread, the angular or ramp surfaces 78 of the teeth preferably extend in the direction of convergence with the adjacent surface of the nut in the direction of rotation of the nut in drawing up the nut whereby the apices of the surfaces 76 are effective to frictionally resist reverse rotation or loosening of the nut. The ratchet shaped teeth shown in FIGURES 6 and 8 may be provided on clamps of the character shown in FIGURES 2 and 4 in lieu of the locking tooth arrangement shown in FIGURES 5 and 7.

It has been found that the serrated or toothed configuration shown in FIGURE 5, or the modified form shown in FIGURE 6, provides an effective locking configuration cooperable with a conventional threaded nut without the use of lock washers or other extraneous locking means. Furthermore, the locking configuration, while very effective in preventing dislodgment or loosening of the nut, does not prevent removal of the nut when substantial pressure is applied in a reverse direction of rotation by a suitable wrench, should it be found necessary or desirable to disassemble the locking bolt from the clamp or clamp component.

It is apparent that, within the scope of the invention, modifications and different arrangements may be made other than as herein disclosed, and the present disclosure is illustrative merely, the invention comprehending all variations thereof.

I claim:

1. A clamp construction comprising a metal clamp member having a planar region and a portion configurated to engage a body to be clamped, said planar region having a circular opening, and a plurality of nut-engaging teeth having sharply pointed apexes of generally pyramidal configuration defining a circle bounding the circular opening, the apexes of the teeth being dimensioned to have substantially point contact with an associated nut.

2. A clamp construction comprising a metal clamp member having a portion configurated to engage a body to be clamped and a planar region, said planar region having two spaced circular openings, and a plurality of nut-engaging teeth having sharply pointed apexes of generally pyramidal configuration with the apexes of the teeth defining a circle bounding each circular opening, the apexes of the teeth bounding each circular opening being dimensioned to have substantially point contact with an associated nut.

3. A clamp construction comprising a metal clamp member having a saddle portion configurated to engage a body to be clamped and a planar region at each side of the saddle portion, each planar region having a circular opening, and a plurality of nut-engaging teeth having sharply pointed apexes of generally pyramidal configuration with the apexes of the teeth defining a circle bounding each circular opening, the apexes of the teeth bounding each circular opening being dimensioned to have substantially point contact with an associated nut.

(Other references on following page)

References Cited by the Examiner
UNITED STATES PATENTS

| | | | | |
|---|---|---|---|---|
| 603,324 | 5/1898 | Eikart | | 151—34 |
| 720,296 | 2/1903 | Straub | | 24—277 |
| 791,504 | 6/1905 | Rosenfeld | | 248—62 |
| 1,107,606 | 8/1914 | Hallowell | | 285—420 X |
| 2,022,801 | 12/1935 | Conner | | 29—150 X |
| 2,397,965 | 4/1946 | Hunz. | | |
| 2,981,351 | 4/1961 | Knickerbocker et al. | | |
| 3,126,934 | 3/1964 | Marx et al. | | 285—420 X |
| 3,199,815 | 8/1965 | Martinkovic et al. | | 248—62 X |
| 3,209,426 | 10/1965 | Vlasak et al. | | 24—277 |

FOREIGN PATENTS

| | | |
|---|---|---|
| 962,080 | 11/1949 | France. |
| 346,614 | 4/1931 | Great Britain. |
| 130,962 | 2/1951 | Sweden. |

WILLIAM FELDMAN, *Primary Examiner.*

D. GRIFFIN, *Assistant Examiner.*